United States Patent [19]

Koslowski

[11] Patent Number: 5,093,093

[45] Date of Patent: Mar. 3, 1992

[54] PROCESS FOR PREPARING CALCIUM SULFATE ALPHA HEMIHYDRATE

[75] Inventor: Thomas Koslowski, Aachen, Fed. Rep. of Germany

[73] Assignees: Promineral Gesellschaft zur Verwendung von Mineralstoffen mbH, Essen; Sicowa Verfahrenstechnik fur Baustoffe GmbH & Co., Aachen, both of Fed. Rep. of Germany

[21] Appl. No.: 458,676

[22] PCT Filed: May 10, 1989

[86] PCT No.: PCT/EP89/00512

§ 371 Date: Jan. 26, 1990

§ 102(e) Date: Jan. 26, 1990

[87] PCT Pub. No.: WO89/10905

PCT Pub. Date: Nov. 16, 1989

[30] Foreign Application Priority Data

May 14, 1988 [DE] Fed. Rep. of Germany ....... 3816513
Dec. 15, 1988 [EP] European Pat. Off. ......... 88120944.9

[51] Int. Cl.[5] ............ C04B 11/02; C04B 11/26; C04B 40/00

[52] U.S. Cl. .................... 423/171; 106/778; 106/784; 106/785; 106/786; 423/555

[58] Field of Search ............... 156/242; 423/266, 172, 423/171, 170, 555; 106/772, 778, 784, 785, 786

[56] References Cited

U.S. PATENT DOCUMENTS

| | | | |
|---|---|---|---|
| 2,448,218 | 8/1948 | Haddon | 423/266 |
| 2,913,308 | 11/1959 | Dailey | 423/172 |
| 3,666,581 | 5/1972 | Lane | 156/242 |
| 4,091,080 | 5/1978 | Kosugi et al. | 423/171 |
| 4,094,693 | 6/1978 | Knorre et al. | 106/778 |
| 4,124,406 | 11/1978 | Knorre et al. | 106/778 |
| 4,201,595 | 5/1980 | O'Neill | 106/783 |
| 4,218,261 | 8/1980 | Takeuchi et al. | 106/785 |
| 5,015,450 | 5/1991 | Koslowski | 423/172 |

FOREIGN PATENT DOCUMENTS 2433554 1/1976 Fed. Rep. of Germany .
884435 11/1959 United Kingdom .

*Primary Examiner*—Gary P. Straub
*Attorney, Agent, or Firm*—Herbert Dubno

[57] ABSTRACT

In a process for preparing calcium sulphate alpha hemihydrate essentially in the form of primary crystals, the hemihydrate is milled to specific surface area of 1200 to 4000 cm$^2$/g, the fines are removed by screening, and a retarder and liquefier in the form of at least one fruit acid and/or its or their salt(s) are admixed. The product obtained is characterized by delayed onset of rigidity, rapid development of resistance and high resistance, and is used in particular as an injection mortar.

7 Claims, 2 Drawing Sheets

PROCESS FOR PREPARING CALCIUM SULFATE ALPHA HEMIHYDRATE

FIELD OF THE INVENTION

The invention relates to a process for the preparation of calcium sulfate alpha hemihydrate.

THE RELATED ART

Various processes are known for the preparation of calcium sulfate alpha hemihydrate, namely so-called wet processes, wherein raw gypsum is continuously passed in a suspension through an autoclave and converted to calcium sulfate hemihydrate, as well as autoclave methods wherein the raw gypsum is introduced in pieces or as briquettes in an autoclave and converted. For instance, in the preparation of calcium sulfate alpha hemihydrate from raw gypsum originating from desulfurization installations of power plants and which has been pressed into briquettes, it is possible to obtain large and regularly shaped crystals (primary crystals) of calcium sulfate alpha hemihydrate, after the autoclave process. The briquettes consisting of primary crystals are broken in a crusher, and this way the primary crystal is broken down into a coarse-grained product with a specific surface of for instance 800 cm$^2$/g.

Such coarse-grained calcium sulfate alpha hemihydrate is in itself a very valuable product when used for the preparation of mortars or the like, due to its reduced water requirements. However, the coarse grain does not lead to a rapid strength development, since the reaction per time unit of the coarse grain with water is relatively reduced and incomplete. In order to accelerate this reaction, the usual accelerating agents can be used. However, they have the disadvantage of leading immediately to onset of strength development. Although this effect can be diminished by feeding additional water amounts, these additional water amounts are actually undesirable. Besides, usually a sufficient holding time is required, in order to prepare the mortar and to bring it to the place where it is needed.

It is therefore the object of the present invention to create a process of the aforementioned kind, which renders possible production of a calcium sulfate alpha hemihydrate with a sufficiently delayed onset of rigidity, but which still leads to a rapid strenth development and a high level of strength.

SUMMARY OF THE INVENTION

This problem is solved by bringing the calcium sulfate alpha hemihydrate, which basically is available in primary crystals, to a degree of fineness corresponding to the strength development required for the intended use, by removing fines through screening and by admixing at least one of the fruit acids and/or their salts as retardants or liquefiers.

By milling the initial coarse-grained product, specific surfaces in the range of approximately 1200 to 4000 cm$^2$/g, particularly 1500 to 3500 cm$^2$/g are selected. Due to the screening, a certain range of grain size can be selected, so that the finest grain, as well as the coarser grain can be eliminated. The fine grain is extremely reactive and has a high water requirement, so that thereby the desirable characteristics would be impaired. Coarser grain does not have a high water requirement, but is not sufficiently reactive.

The fruit acids, e.g. malic acid and tartaric acid, particularly citric acid, or their water-soluble salts, which can be used separately or in combination, delay the onset of rigidity. At the same time these compounds serve as liquefiers, whose effect starts immediately when the calcium sulfate alpha hemihydrate comes in contact with the mixing water. Besides, as a result, the compression strength is considerably increased. This is particularly surprising, since up to now citric acid has been considered as an additive with a delaying, strength-reducing effect, when used in small amounts under 0.1M.-%, while in larger amounts it even avoids strength development, compare with ULIMANNS ENZYKLOPADIE DER TECHNISCHEN CHEMIE, 4th Edition, Volume 12, Page 307, and R. A. Kuntze, THE CHEMISTRY AND TECHNOLOGY OF GYPSUM, ASTM Special Technical Publication 861, 1984, so that citric acid, as well as other related fruit acids were considered up to now as undesirable.

The fruit acid is added particularly in an amount of 0.005 to 0.05M.-%, preferably in an amount of 0.02M.-%, possibly as citric acid monohydrate.

DETAILED DESCRIPTION OF THE INVENTION

Figure 1:
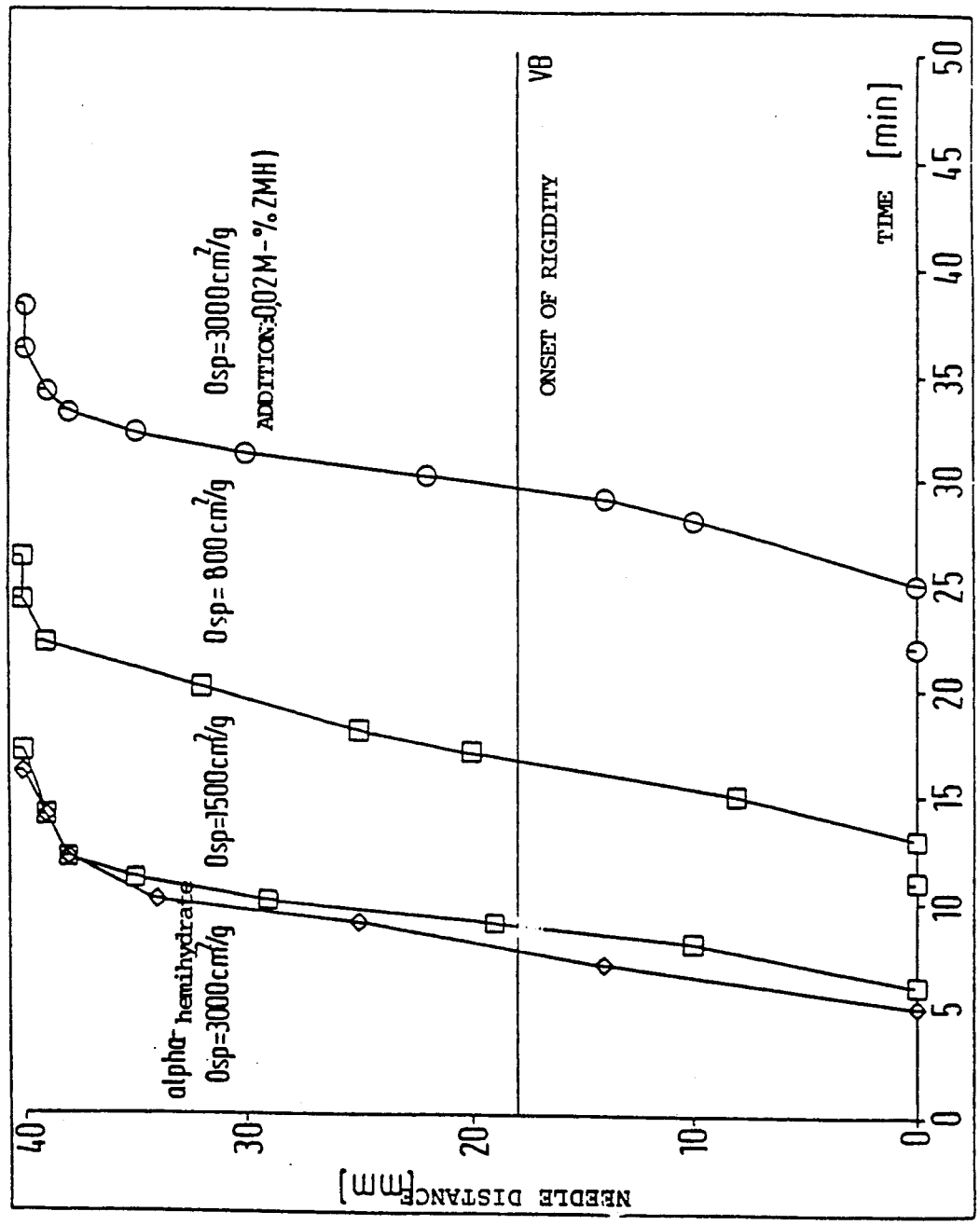
FIG. 1 shows the relationship between the onset of rigidity in relationship to the grain fineness (surface area) of the calcium sulfate alpha hemihydrate.

In FIG. 1, the rigidity of calcium sulfate alpha hemihydrate is diagrammatically shown in relation to the grain fineness. Needle distance in mm of a Vicat apparatus based on DIN 1168 is shown on the ordinate. Time is shown in minutes on the abscissa. It is evident that onset of rigidity is pushed towards shorter times with the increase in the specific surface $O_{sp}$. By adding 0.02M.-% citric acid monohydrate the onset of rigidity in a paste made of calcium sulfate alpha hemihydrate with a specific surface of 3000 cm$^2$/g was pushed up from approximately 7 minutes to approximately 30 minutes.

Figure 2:
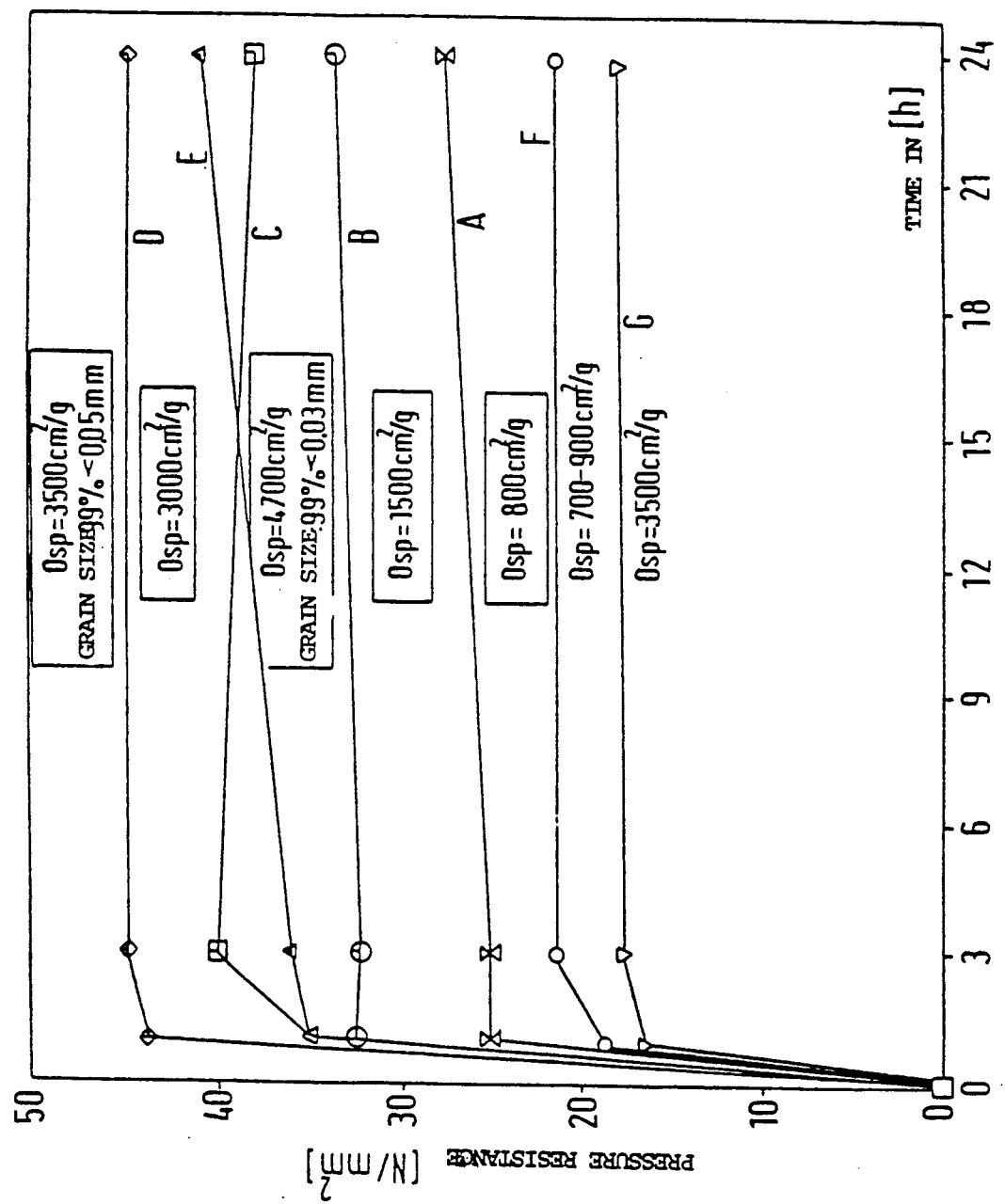
FIG. 2 shows the relationship between strength and the grain fineness (surface area) of the calcium sulfate alpha hemihydrate.

As can be seen from FIG. 2, the milling fineness influences the strength development. In FIG. 2, the compression strength in M/mm$^2$ is entered on the ordinate, while the time in hours is entered on the abscissa, whereby the various curves A to E represent the strength development in pastes of calcium sulfate hemihydrate with the specific surface indicated each time, in the case of an addition of 0.02M.-% of citric acid monohydrate.

As can be seen from the figure, the finest grain (specific surface 4700 cm$^2$/g, grain size 99% under 0.03 mm) leads to a decrease of the compression strength in comparison with a binder granulation of 3000 or 3500 cm$^2$/g. The water requirement, expressed in the ratio water/gypsum equals 0.28 in each of these cases.

Besides, for comparison, FIG. 2 shows the strength development for a paste with a specific surface of 700–900 cm$^2$/g (water/gypsum ratio of 0.31), as well as 3500 cm$^2$/g (water/gypsum ratio 0.35), compare curves F,G, but without the addition of fruit acids. Here, the achieved strength levels are considerably below the ones achieved with the addition of fruit acids. Besides, it becomes evident that the comminution of coarse-grained material, in the absence of fruit-acid additives, has a negative influence on the strength development.

By using calcium sulfate alpha hemihydrate with various fineness, the strength development can be correspondingly controlled.

Preferably, the fruit acids and/or their salts are admixed to the milled and screened calcium sulfate alpha hemihydrate as fine particles, but it is also possible to dissolve them in the mixing water and this way to reach the desired strength development and the increased strength level. Besides, the salts of the fruit acid can be introduced into the product already in a previous preparation process, in that the fruit acid or its salt, has already been added as an agent influencing crystalline growth in the recrystallization of calcium sulfate dihydrate to alpha hemihydrate. The process is particularly suited for the use of alpha hemihydrate which has been prepared through recrystallization of dihydrate in autoclaves with the addition of a crystalline growth influencing agent in the form of finely ground brown coal and/or peat and or finely ground wood and/or humic acid and or wood-components with the same effect, preferably with a particle size under 100 µm. This can be ground brown coal, in an amount of 0.1 to 1.0% by mass, preferably 0.5 to 0.7% by mass. It is possible to use ground peat in an amount of 0.1 to 1.5% by mass, preferably 0.5 to 1% by mass. Wood components with similar effects are also ground wood, which is added in an amount of 0.3 to 2.0% by mass preferably 0.7 to 1.5% by mass. Humic acid can be added in an amount of 0.1 to 1.0% by mass, preferably 0.3 to 7% by mass as wood-component. Sulfite waste liquor functions as a growth-influencing additive in an amount of 0.1 to 3.0% by mass, preferably 0.5 to 2% by mass. Also components of sulfite waste liquor having the same effect or secondary conversion products of native lignine such as for instance lignine-sulfonic acid, can be used in an amount of 0.1 to 1.5% by mass, preferably 0.3 to 0.8% by mass. Finally, these additives can also be lignine sulfonate in an amount of 0.1 to 1.2% by mass, preferably of 0.3 to 0.8% by mass. A further growth influencing step consists in that a part of the calcium sulfate alpha hemihydrate to be converted originates from the flue-gas desulfurization gypsum of a power plant run with brown coal, for instance in an amount of at least 25% by mass.

The calcium sulfate alpha hemihydrate prepared this way is particularly suited for the production of pneumatically transportable injection mortars, which are wetted with water at discharge, for dam construction materials affording immediate- or preliminary support for underground use.

I claim:

1. A process for preparing calcium sulfate alpha hemihydrate in granular form having a specific surface area of 1200 to 4000 cm$^2$/g, which comprises the steps of:
   (a) milling crystalline calcium sulfate alpha hemihydrate to obtain a granular calcium sulfate alpha hemihydrate having a specific surface area of 1200 to 4000 cm$^2$/g;
   (b) screening the granular calcium sulfate alpha hemihydrate produced during step (a) to eliminate coarser and finer grains, after said screening said product having a specific surface area of 1200 to 4000 cm$^2$/g and particle size greater than 0.03 mm; and
   (c) admixing 0.005 to 0.05% of at least one fruit acid selected from the group consisting of malic acid, tartaric acid, citric acid, and their salts and monohydrates, with the ground and screened calcium sulfate alpha hemihydrate produced during steps (a) and (b).

2. Process according to claim 1, wherein the screening step achieves a hemihydrate having a specific surface approximately between 1500 and 3500 cm$^2$/g.

3. Process according to claim 1, wherein the fruit acids are admixed in an amount of from 0.005 to 0.02% by mass.

4. Process according to claim 1, wherein the fruit acid is citric acid monohydrate.

5. Process according to claim 1, wherein the fruit acids are admixed as fine particles.

6. Process according to claim 1, further comprising adding to the milled calcium sulfate alpha hemihydrate a growth-influencing additive selected from the group consisting of finely ground brown coal, finely ground peat, finely ground wood, humic acid, and wood components.

7. Process according to claim 1, wherein the crystalline calcium sulfate alpha hemihydrate has been produced from calcium sulfate dihydrate from a flue-gas desulfurization installation of a power plant running on brown coal.

* * * * *